United States Patent Office 3,103,786
Patented Sept. 17, 1963

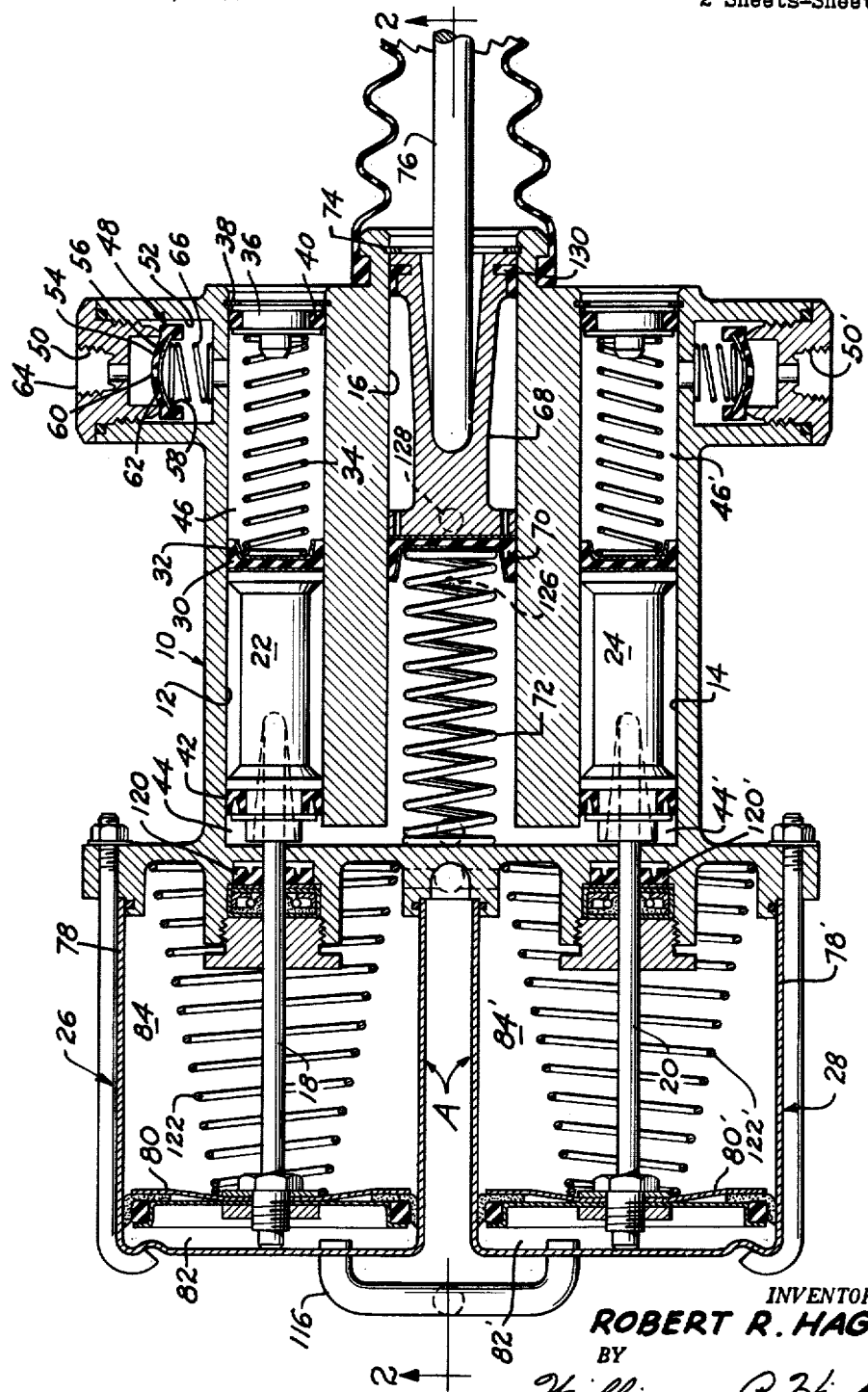

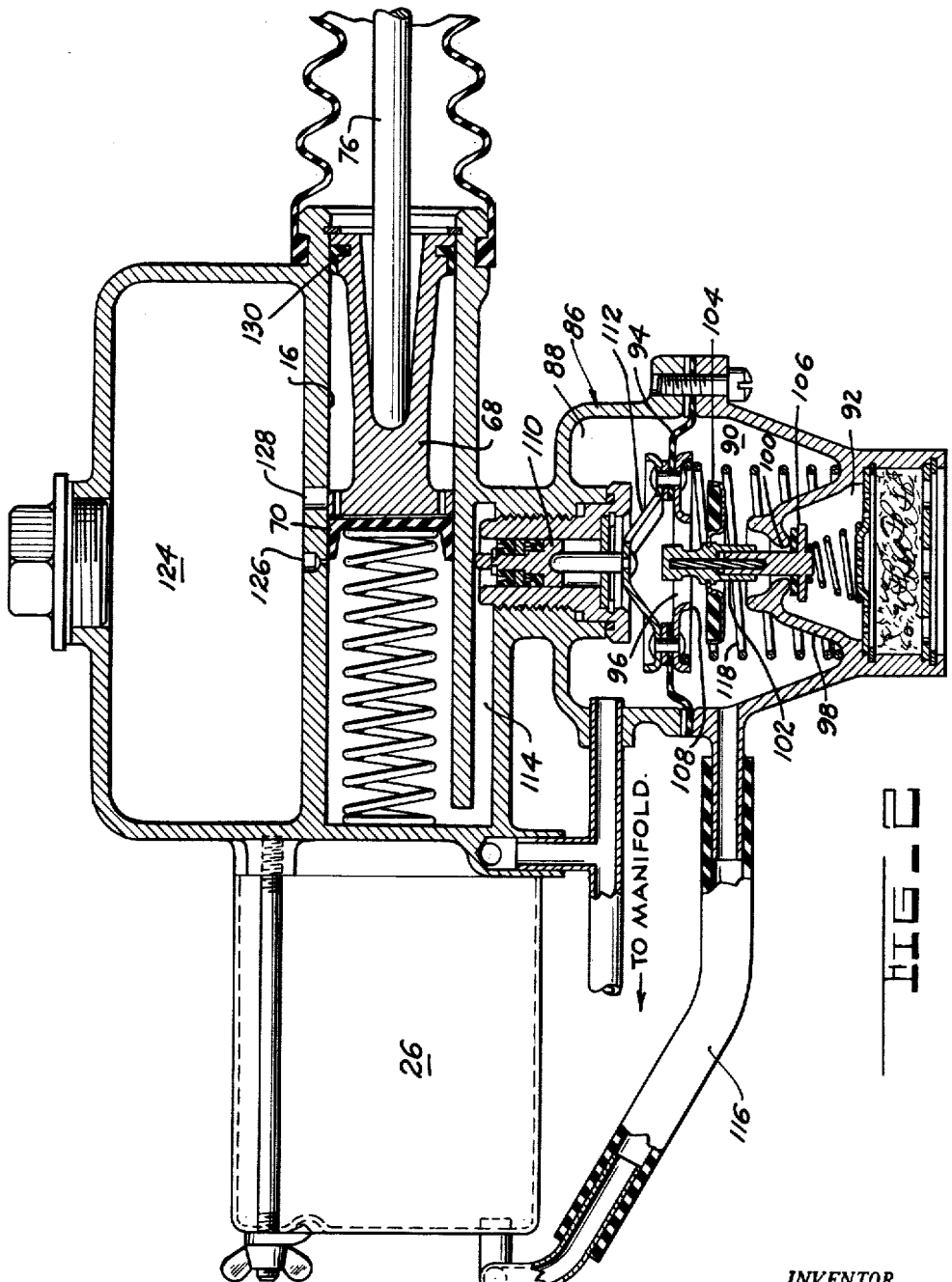

3,103,786
POWER OPERATED MASTER CYLINDER
Robert R. Hager, South Bend, Ind., assignor to The Bendix Corporation, South Bend, Ind., a corporation of Delaware
Filed Oct. 20, 1960, Ser. No. 63,847
4 Claims. (Cl. 60—54.6)

The present invention relates to power driven master cylinders; and more particularly to power driven multiple barrel master cylinders.

An object of the present invention is the provision of a new and improved power operated master cylinder which can be operated manually without moving the power driven parts of the unit servomotor.

Another object of the present invention is the provision of a new and improved power actuated triple barrel master cylinder in which pressure from the primary hydraulic chamber of the master cylinder is communicated to the follow-up chamber of the secondary cylinders or bores; and in which the power driven elements of the unit's fluid pressure servomotor project through the end wall of each follow-up chamber and abut the fluid displacement members of the secondary cylinders so that the power elements of the servomotor mechanism are not moved during power failure.

The invention resides in certain constructions, combinations and arrangements of parts; and further objects and advantages will become apparent to those skilled in the art to which the invention relates from the following description of the preferred embodiment described with reference to the accompanying drawings forming a part of the specification, and in which:

FIGURE 1 is a horizontal cross-sectional view through a servomotor driven triple barrel master cylinder embodying principles of the present invention; and FIGURE 2 is a vertical cross-sectional view taken approximately on the line 2—2 of FIGURE 1.

The servomotor driven triple barrel master cylinder shown in the drawing generally comprises a housing 10 having a pair of generally parallel and axially extending secondary cyinders 12 and 14 positioned on opposite sides of an axially extending primary fluid pressurizing chamber 16. The unit further includes fluid pressure servomotor means positioned adjacent one end of the housing 10—which servomotor means includes a pair of force transmitting rods which extend through the end wall of the housing 10 for the power actuation of the fluid displacement members 22 and 24 in the secondary cylinders 12 and 14 respectively. The force transmitting rods 18 and 20 may be driven from a single servomotor unit by means of a walking beam or other suitable arrangement; but as shown in the drawing are driven by separate fluid pressure motors 26 and 28 which will later be described in detail.

The secondary fluid displacement member or piston 22 is a generally spool-shaped structure normally positioned in the forward end of the secondary cylinder 12 adjacent the servomotor 26. The rear end of the piston 22 has a generally flat face, against which a cup-seal 30 is held by means of a retainer 32 and piston return spring 34. The other end of the piston return spring 34 is positioned against an end closure member 36 which is held in the end of the cylinder or bore 12 by means of a snap ring 38. The end closure member 36 is provided with a suitable recess in which a suitable O-ring 40 is positioned to seal off the end of the cylinder 12. The forward or opposite end of the secondary piston is provided with a recess in which an annular cup-seal 42 is positioned to seal off the portion of the bore 12 adjacent the forward end of the piston 22— which portion will thereafter be called the follow-up cylinder 44. The portion of the chamber 12 rearwardly of the secondary piston 22 will hereafter be called the output chamber 46; and the fluid displaced from the output chamber 46 passes through a conventional residual pressure check valve structure, generally indicated at 48, to an outlet connection 50. The outlet 50 will normally be connected to a braking system, not shown, which actuates one half of the brakes in an automotive vehicle. The residual pressure check valve structure 48 is positioned in a counterbore 52 which communicates with the rear end of the output chamber 46. A valve poppet 54 is positioned in counterbore 52 and comprises a rubber membrane 56 which is stretched over a metal disc 58 and is held in place by means of a thickened peripheral portion which is snapped over the outer edge of the metal disc 58. The membrane 56 has a single centrally located opening 60, and the metal disc 58 has a plurality of openings 62 which are positioned off center with respect to the opening 60, so that the membrane normally closes off the openings 62. The valve poppet 54 is normally biased into sealing engagement with an end closure member 64 by means of a coil spring 66 to prevent flow outwardly of the chamber 46 around the outside edge of the valve poppet 65. Fluid flow out through outlet connection 50 is therefore required to pass through the openings 62 to force the membranes 56 away from the disc 58; and thereafter it kows through the opening 60 of the membrane to the outlet connection 50. Return flow from the connection 50 will of course force the membrane 56 into sealing engagement with the disc 58. Return fluid flow forces the valve poppet 54 away from the outlet conection 64 against the force of the coil spring 66, and thereafter passes around the periphery of the valve poppet 54 to the outlet chamber 46. The other secondary piston 24 divides the other secondary cylinder 14 into follow-up and output chambers similar to those above described; and inasmuch as their parts are identical to those above described for secondary cylinder 12, they will be designated by a like reference numeral characterized further in that a prime mark is affixed thereto.

The primary fluid pressurizing chamber 16 is intended to supply the initial pressure signal for actuating each of the pistons 22 and 24. The primary chamber 16 is provided with a primary fluid displacement member or piston 68 which is normally positioned in the rear portion of the primary chamber 16. The piston 68 is a generally spool-shaped structure having a cup-seal 70 on its inner or forward end. The seal 70 is held in position by a piston return spring 72 which biases the piston 68 against the snap ring 74 adjacent the outer or rearward end of the chamber 16. The piston 68 is adapted to be driven forwardly by means of the conventional push rod 76 to force fluid from the inner end of the primary chamber 16 through suitable passages to follow up chambers 44 and 44' of the two secondary fluid pressurizing systems. Pressure from the primary chamber 16 therefore is exerted against both pistons 22 and 24 to simultaneously force fluid out of the output chambers 46 and 46' to the systems which are respectively connected to the outlet ports 50 and 50'. These systems can therefore be completely actuated and controlled by means of pressure which is manually developed within the primary fluid pressurizing chamber 16 by means of force applied to the push rod 76.

As previously indicated the secondary fluid pressurizing pistons 22 and 24 can also be actuated by means of the servomotor means A; and according to principles of the present invention, this is accomplished by means of push rods 18 and 20 which project through the respective end walls of the secondary cylinders 12 and 14 to abut the secondary pistons 22 and 24. The force transmitting rods 18 and 20 are preferably of as small diameter as feasible for the loads which are intended to be transmitted; so that the force which is exerted upon these rods 18 and 20 merely assist the pressure forces supplied from the primary piston 68. Inasmuch as the ends of the push rods 18 and 20 merely abut the ends of the secondary pistons 22 and 24, the pistons 22 and 24 are free to move away from the push rods 18 and 20 so that the pressure which is supplied to the chambers 44 and 44' need not move the power driven elements attached to the push rods 18 and 20 during power failure of the servomotor means a. It will further be seen that the pressure which is supplied to the follow-up chambers 44 and 44' will resist inward movement of the push rods 18 and 20 respectively and thereby hold them in their normal retracted positions shown in the drawing.

As previously indicated, the servomotor means A may be a single motor which drives a suitable force transmitting system connected to the push rods 18 and 20; but, as shown in the drawings, comprises the individual servomotors 26 and 28 that are identical and which are associated with the push rods 18 and 20 respectively. Inasmuch as the fluid pressure servomotors 26 and 28 are identical, only one will be described in detail, and the corresponding parts of the other motor will be designated by like reference numeral characterized further in that a prime mark is affixed thereto. The fluid pressure motor 26 comprises a generally cup-shaped housing or cam 78 which is suitably sealingly clamped to the forward end of the housing 10. The forward end of the rod 18 is provided with suitable piston structure 80 having the usual sliding seal with respect to the inner sidewalls of the cup-shaped housing 78, so as to divide the inner chamber of the housing into forward and rearward power chambers 82 and 84 respectively. The fluid pressure motors 26 and 28 may be driven by air pressure to atmosphere, or atmospheric to vacuum pressure differential; and as shown in the drawing uses the vacuum to air differential which is developed in the manifold of the engine of the vehicle on which the power braking system is mounted.

The fluid pressure motors 26 and 28 are controlled by means of a single control valve 86 which in turn is actuated and regulated by means of the fluid pressure generated in the primary fluid pressurizing chamber 16. The control valve 86 is generally that shown and described in the Earl R. Price Patent 2,654,391, and so need not be described in detail. In order, however, that an understanding of the device can be had without reference to that patent, a short general description of the control valve will now be given. The control valve 86 generally comprises a vacuum chamber 88, control chamber 90, and atmospheric chamber 92, spaced apart in that order. The vacuum and control chambers 88 and 90 are separated by means of a flexible diaphragm 94 which carries a suitable vacuum valve seat 96 thereon; and the control and atmospheric chambers 90 and 92 respectively are separated by means of a rigid partition 98 having a centrally located atmospheric valve port 100 extending therethrough. Air flow through the vacuum valve port 96 and atmospheric valve port 100 is controlled by means of a generally spool-shaped poppet 102—the central portion of which extends through the atmospheric port 100; so that the inner flange 104 of the spool-shaped poppet member 102 controls flow through the vacuum valve port 96, and the outer flange 106 controls flow through the atmospheric valve port 100. The deflexible diaphragm 94 is provided with an annular stiffening ring which forms the vacuum valve seat 108 for sealing abutment with the inner flange 104 of the poppet member 102. The control valve 86 is actuated by means of a hydraulic plunger 110 which is suitably connected to the stiffening ring of the diaphragm 94 by means of a suitable spider 112, so that the seat 108 can be moved towards the poppet member 102. Pressure from the primary fluid pressurizing chamber 16 is communicated to the plunger 110 by means of suitable passageways 114, so that actuation of the push rod 76 causes the plunger 110 to move the vacuum valve seat 108 into engagement with the flange 104 and thereafter lift the other flange 106 of the poppet member away from the rigid partition member 98. Vacuum from the manifold of the vehicle's propelling engine is of course continually communicated to the rear power chambers 84 and 84' of the fluid pressure motors 26 and 28 respectively, and to the vacuum valve chamber 88. The control valve 86 will normally be in the position shown in the drawing so that vacuum will normally be communicated through the vacuum port 96 to the control chamber 90, and thence through the control tube 116 to the front power chambers 82 and 82' respectively. This of course produces a pressure differential across the pistons 80 and 80' causing them to force the force transmitting rods 18 and 20 inwardly against the secondary pistons 22 and 24 to supplement the pressure forces created by the primary piston 68. The control valve 86 also includes a valve return spring 118 which biases the valve to its normal deenergized condition shown in the drawing; so that a release of force on the push rod 76 allows pressure differential on the diaphragm 94, coupled with the force of the spring 118, to open the vacuum valve port 96 and reduce the force developed by the motors 26 and 28. By this mechanism the valve causes the pistons 80 and 80' to be actuated with a force generally proportional to the pressure intensity that is generated in the primary chamber 16. Suitable sealing structure 120 and 120' are provided around the push rods 18 and 20 respectively and the power pistons 80 and 80' are normally biased to the retracted position shown in the drawing by means of piston return springs 122 and 122' respectively. It will be seen therefore the control valve 86 causes the servomotor means A to produce an inward force on the push rods 18 and 20 which at all times is generally proportional to the hydraulic pressure which is created in the inner end of the primary cylinder 16. It will further be seen that the force applied by the servomotor means merely supplements that created by the hydraulic pressure produced by the primary piston 68; and that this pressure is free to move the pistons 22 and 24 down their bore without dragging the power pistons 80 or 80' during power failure of the servomotor means A.

The master cylinder arrangement shown in the drawing is completed with the usual compensating structure including the reservoir 124 which overlies each of the primary and secondary chambers to at all times insure that the output chambers 46 and 46' as well as the inner of primary chamber 16 is filled with hydraulic fluid. The compensating port 126 is positioned just forwardly of the normal retracted position of the primary seal 70 and another port 128 is positioned rearwardly of the seal 70 to prevent vacuum from being created outwardly of the seal 70. Another seal 130 is carried on the rearward end of the piston 68 to prevent leakage out of the outer end of the chamber 16. Compensating ports not shown similar to ports 126 and 128 are provided for each of the pistons 22 and 24 to at all times insure that the outlet chambers 46 and 46' are filled with fluid, and insure that the portion of the cylinders between the seals 40 and 42 are maintained at substantially atmospheric pressure.

While the invention has been described in considerable detail, I do not wish to be limited to the particular instructions shown and described; and it is my intention to cover hereby all novel adaptations, modifications and arrangements thereof which come within the practice of those skilled in the art to which the invention relates.

I claim:
1. A fluid pressure developing unit comprising:
   a housing having a primary fluid pressure chamber and at least one secondary fluid pressure chamber, which chambers are divided into variable volume chambers by respective primary and secondary movable walls;
a servomotor means including a control device;
passage means for simultaneously communicating said primary fluid pressure chamber to said control device and said secondary fluid chamber whereupon said secondary movable wall and said control device are operated by pressure developed by said primary movable wall within said primary fluid pressure chamber; and
means releasably connecting said secondary movable walls and said servomotor means, said means being force transmitting rods operatively connected to said servomotor means such that whenever power is available to said servomotor said servomotor assists said primary movable wall in operating said secondary movable wall to develop pressure within said secondary chamber whereas said secondary movable wall is free to move relative to said force transmitting rods whenever power is not available to said servomotor means.

2. A fluid pressure developing unit comprising:
a housing having a primary fluid pressure chamber and at least two secondary fluid pressure chambers, which chambers are divided into displacement and follow-up variable volume chambers by respective primary and secondary movable walls;
a servomotor means including a pressure responsive control valve;
passage means for communicating said displacement chamber of said primary fluid pressure chamber to said follow-up chambers of said secondary fluid pressure chambers and for communicating said displacement chamber of said primary fluid pressure chamber to said pressure responsive control valve whereupon actuation of said primary movable wall simultaneously operates said secondary movable walls and said control valve; and
at least two actuating rods operatively connected to said servomotor means and said secondary movable walls whereupon said servomotor may assist said primary movable wall in operating said secondary movable walls and yet permit said secondary movable walls to move free of said servomotor means when said control valve cannot schedule enough power to operate said servomotor means.

3. A power operating master cylinder unit comprising:
a housing having a pair of cylinders, fluid pressure servomotor means adjacent one end of said secondary cylinders, individual fluid displacement members in respective cylinders dividing respective cylinders into a follow-up chamber adjacent said servomotor means and an output chamber spaced on the other side of said fluid displacement members, force transmitting rods driven by said servomotor means and projecting into said follow-up chambers and releasably abutting against said displacement members to move said displacement members in the direction of said output chambers only, a primary pressure regulating device in said housing supplying control pressure to said follow-up chambers to normally drive said secondary fluid displacement members, a control valve for said servomotor means, and means actuated by the output pressure of said primary pressure regulating device for regulating said control valve.

4. A power operating master cylinder unit comprising:
a housing having a pair of cylinders, fluid pressure servomotor means adjacent one end of said cylinders, individual fluid displacement members in respective cylinders dividing respective cylinders into a follow-up chamber adjacent said servomotor means and an output chamber spaced on the other side of said fluid displacement members, force transmitting rods driven by said servomotor means and projecting into said follow-up chambers and releasably abutting against said displacement members to move said displacement members in the direction of said output chambers only, a primary fluid pressurizing chamber in said housing, a primary fluid displacement member in said primary chamber for forcing fluid into said follow-up chambers to normally drive said secondary fluid displacement members, and control valve means regulated by the output pressure from said primary chamber for causing said servomotor means to normally drive said secondary displacement members toward their output chambers.

References Cited in the file of this patent
UNITED STATES PATENTS

| | | |
|---|---|---|
| 1,781,868 | Bragg et al. | Nov. 18, 1930 |
| 2,241,374 | Alfieri | May 13, 1941 |
| 2,404,932 | Stelzer | July 30, 1946 |
| 2,646,665 | Rockwell | July 28, 1953 |
| 2,705,402 | Stelzer | Apr. 5, 1955 |
| 2,762,199 | Major | Sept. 11, 1956 |
| 2,852,920 | Stelzer | Sept. 23, 1958 |
| 2,957,454 | Stelzer | Oct. 25, 1960 |

UNITED STATES PATENT OFFICE
CERTIFICATE OF CORRECTION

Patent No. 3,103,786            September 17, 1963

Robert R. Hager

It is hereby certified that error appears in the above numbered patent requiring correction and that the said Letters Patent should read as corrected below.

Column 2, line 25, for "65" read -- 54 --; line 28, for "kows" read -- flows --; same column 2, line 33, for "conection" read -- connection --; column 4, line 50, after "inner" insert -- end --.

Signed and sealed this 21st day of April 1964.

(SEAL)
Attest:

ERNEST W. SWIDER

Attesting Officer

EDWARD J. BRENNER

Commissioner of Patents